(12) United States Patent
Yuzuriha

(10) Patent No.: US 11,323,802 B2
(45) Date of Patent: May 3, 2022

(54) SIGNAL PROCESSING DEVICE AND SIGNAL PROCESSING METHOD

(71) Applicant: Panasonic Intellectual Property Corporation of America, Torrance, CA (US)

(72) Inventor: Shinichi Yuzuriha, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

(21) Appl. No.: 16/806,190

(22) Filed: Mar. 2, 2020

(65) Prior Publication Data

US 2020/0288239 A1 Sep. 10, 2020

(30) Foreign Application Priority Data

Mar. 6, 2019 (JP) .............................. JP2019-040131

(51) Int. Cl.
*H04R 3/00* (2006.01)
*H04R 3/04* (2006.01)
*H04R 5/027* (2006.01)
*H04R 5/04* (2006.01)
*B60R 11/02* (2006.01)

(52) U.S. Cl.
CPC .......... *H04R 3/005* (2013.01); *B60R 11/0247* (2013.01); *H04R 3/04* (2013.01); *H04R 5/027* (2013.01); *H04R 5/04* (2013.01); *H04R 2499/13* (2013.01)

(58) Field of Classification Search
CPC .......... H04R 3/005; H04R 3/04; H04R 5/027; H04R 5/04; H04R 2499/13
See application file for complete search history.

(56) References Cited

U.S. PATENT DOCUMENTS

| 7,146,013 B1 * | 12/2006 | Saito ...................... H04R 3/005 381/92 |
| 8,682,658 B2 | 3/2014 | Vitte et al. |
| 2003/0031328 A1 * | 2/2003 | Elko ...................... H04R 1/406 381/92 |
| 2007/0276660 A1 * | 11/2007 | Pinto ................... G10L 21/0208 704/219 |

(Continued)

FOREIGN PATENT DOCUMENTS

JP 2017-83600 5/2017

OTHER PUBLICATIONS

Extended Search Report dated Apr. 9, 2020 in corresponding European Patent Application No. 20159300.1.

(Continued)

*Primary Examiner* — David L Ton
(74) *Attorney, Agent, or Firm* — Wenderoth, Lind & Ponack, L.L.P.

(57) ABSTRACT

Included are a first obtainer which obtains a first signal output from a first microphone, a second obtainer which obtains a second signal output from a second microphone installed in a position different from a position where first microphone is installed, a delayer which delays the second signal, a mixed sounds estimator which estimates noises mixed in the first signal on the basis of the second signal delayed by the delayer, and an eraser which erases the noises from the first signal, the noises being estimated by the mixed sounds estimator.

5 Claims, 9 Drawing Sheets

(56) References Cited

U.S. PATENT DOCUMENTS

| | | | |
|---|---|---|---|
| 2008/0280653 A1* | 11/2008 | Ma | H04M 9/082 |
| | | | 455/569.1 |
| 2009/0175466 A1* | 7/2009 | Elko | H04R 25/407 |
| | | | 381/94.2 |
| 2015/0063592 A1* | 3/2015 | Konchitsky | H04R 1/406 |
| | | | 381/94.1 |
| 2015/0213811 A1* | 7/2015 | Elko | H04R 25/453 |
| | | | 381/92 |
| 2017/0064441 A1* | 3/2017 | Kanamori | G01S 3/801 |
| 2017/0116983 A1 | 4/2017 | Furukawa et al. | |
| 2018/0277137 A1* | 9/2018 | Elko | H04R 1/406 |

OTHER PUBLICATIONS

Singh A., "Adaptive Noise Cancellation", Dept. of Electronics & Communication, Netaji Subhas Institute of Technology, Jan. 1, 1997.

* cited by examiner

SIGNAL PROCESSING DEVICE AND SIGNAL PROCESSING METHOD

CROSS REFERENCE TO RELATED APPLICATIONS

The present application is based on and claims priority of Japanese Patent Application No. 2019-040131 filed on Mar. 6, 2019. The entire disclosure of the above-identified application, including the specification, drawings and claims is incorporated herein by reference in its entirety.

FIELD

The present disclosure relates to signal processing devices and signal processing methods.

BACKGROUND

As one of vehicle-installed appliances, a sound pickup apparatus is often installed mainly in driver's seats in order to obtain a voice of a driver or the like in vehicles. The sound pickup apparatus enables the driver or the like to perform operations with the voice during use of infotainment or the like. For example, PTL 1 discloses a vehicle-installed sound pickup device and a sound pickup method which can estimate and suppress noises mixed in the target voice such as the voice of the driver, where the noises are voices and the like of others than the voice of the driver.

CITATION LIST

Patent Literature

PTL 1: Japanese Unexamined Patent Application No. 2017-083600

SUMMARY

The signal processing device according to the present disclosure includes: a first obtainer which obtains a first signal output from a first microphone; a second obtainer which obtains a second signal output from a second microphone installed in a position different from a position where the first microphone is installed; a delayer which delays the second signal; a mixed sounds estimator which estimates noises mixed in the first signal on a basis of the second signal delayed by the delayer; and an eraser which erases the noises from the first signal, the noises being estimated by the mixed sounds estimator.

The signal processing method according to the present disclosure includes: obtaining a first signal output from a first microphone; obtaining a second signal output from a second microphone installed in a position different from a position where the first microphone is installed; delaying the second signal; estimating noises mixed in the first signal on a basis of the second signal delayed by the delaying; and erasing the noises from the first signal, the noises being estimated in the estimating.

BRIEF DESCRIPTION OF DRAWINGS

These and other advantages and features will become apparent from the following description thereof taken in conjunction with the accompanying Drawings, by way of non-limiting examples of embodiments disclosed herein.

Figure 1:
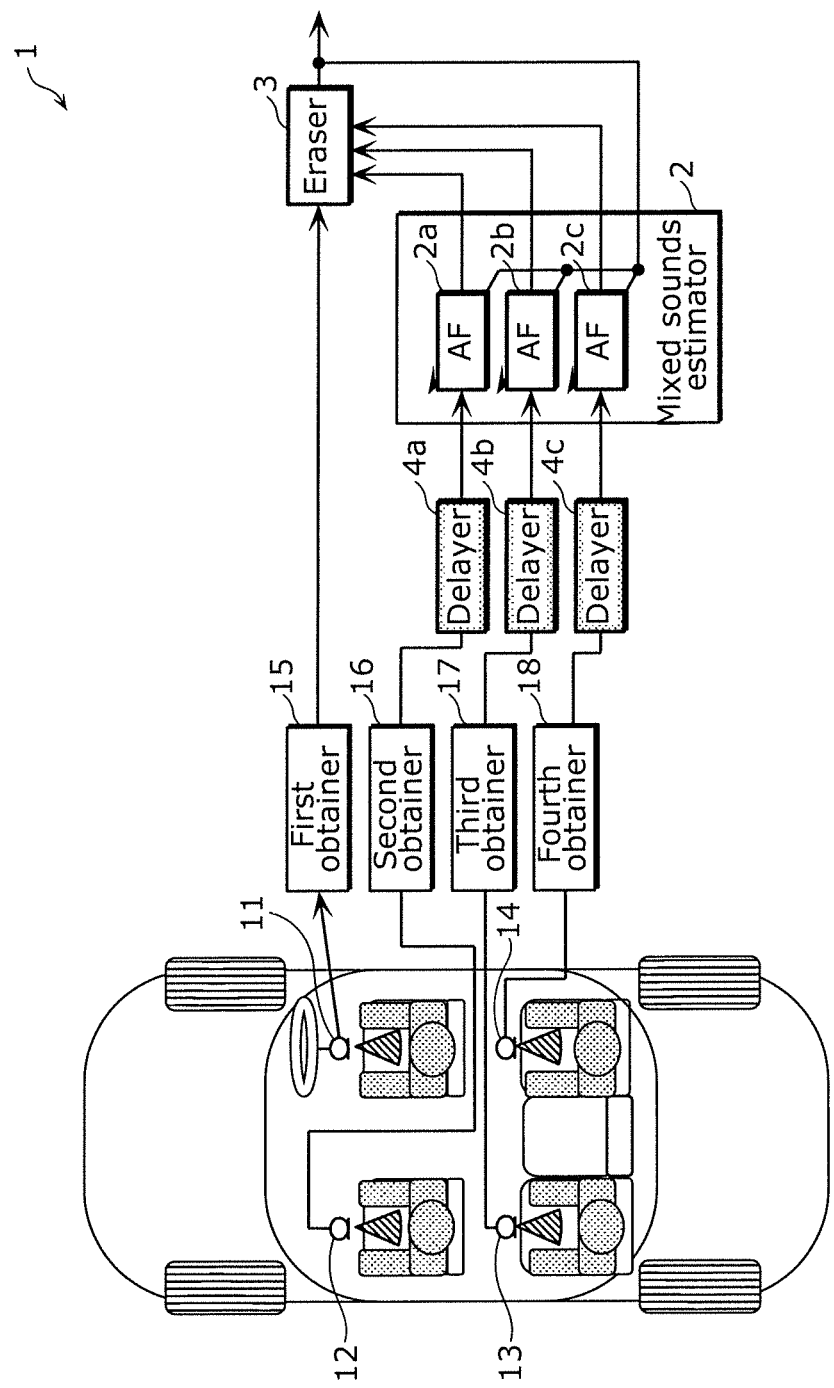
FIG. 1 is a block diagram illustrating a signal processing device according to an embodiment of the present disclosure.

DESCRIPTION OF EMBODIMENT (Underlying Knowledge Forming Basis of the Present Disclosure)

To estimate noises from a target voice, conventional approaches are used in which a signal obtained from a microphone located in a position spaced from a microphone which obtains the target voice is used to estimate noises picked up by the microphone which obtains the target voice, and to suppress the noises mixed in the target voice. For example, in the case where it is desired to obtain the voice of the driver from a microphone installed in the driver's seat, the voice produced by the passenger in a seat other than the driver's seat and included in the voice obtained by the microphone installed in the driver's seat should be specified. For this reason, the voice of the passenger in the seat other than the driver's seat mixed in the voice obtained by the microphone installed in the driver's seat is specified using the voices obtained by the microphones installed in the seats other than the driver's seat, respectively. To use this approach, the operation of the sound pickup apparatuses installed in the respective seats, such as the microphones, should be controlled in synchronization with the timings of the speeches of the passengers. However, it is difficult to determine whether the passengers in the respective seats speak or not. When the operation is controlled from a wrong determination whether the passengers in the seats speak or not, the target voice is undesirably suppressed. Moreover, when the operation is controlled from such a wrong determination whether the passengers in the seats speak or not, the performance to suppress noises mixed in the target voice, such as the voices of other passengers, is also reduced.

The signal processing device according to one aspect of the present disclosure may include a first obtainer which obtains a first signal output from a first microphone, a second obtainer which obtains a second signal output from a second microphone installed in a position different from a position where the first microphone is installed, a delayer which delays the second signal, a mixed sounds estimator which estimates noises mixed in the first signal on the basis of the second signal delayed by the delayer, and an eraser which erases the noises from the first signal, the noises being estimated by the mixed sounds estimator.

Thereby, the signal processing device according to one aspect of the present disclosure can suppress the signal representing the voice as one of noises mixed in the target voice without suppressing the signal representing the target voice. Accordingly, the signal processing device according to one aspect of the present disclosure can more accurately recognize the target voice.

For example, the delayer may delay the second signal by the time determined on the basis of the positional relation between the first microphone and the second microphone.

Thereby, the signal processing device according to one aspect of the present disclosure can prevent the second signal representing noises from reaching the eraser earlier than the first signal representing the target voice. Accordingly, the signal processing device according to one aspect of the present disclosure can process the first signal, which has already reached the eraser, using the second signal.

For example, the delayer may delay the second signal on the basis of the frequency component included in the second signal.

Thereby, the signal processing device according to one aspect of the present disclosure can set a delay time more suitable for the second signal representing noises. Accordingly, the signal processing device according to one aspect of the present disclosure can more effectively suppress the noises mixed in the first signal representing the target voice.

Moreover, the signal processing method according to one aspect of the present disclosure may include obtaining a first signal output from a first microphone; obtaining a second signal output from a second microphone installed in a position different from a position where the first microphone is installed; delaying the second signal; estimating noises mixed in the first signal on the basis of the second signal delayed in the delaying; and erasing the noises from the first signal, the noises being estimated in the estimating.

Thereby, the signal processing method according to one aspect of the present disclosure can suppress the signal representing the voice as one of noises mixed in the target voice without suppressing the signal representing the target voice. Accordingly, the signal processing device according to one aspect of the present disclosure enables more accurate recognition of the target voice.

Embodiment

An embodiment will now be specifically described with reference to the drawings.

FIG. 1 is a block diagram illustrating a signal processing device according to an embodiment of the present disclosure. A signal processing device 1 according to the embodiment of the present disclosure includes microphones 11, 12, 13, and 14, a first obtainer 15, a second obtainer 16, a third obtainer 17, a fourth obtainer 18, delayers 4a, 4b, and 4c, a mixed sounds estimator 2 including adaptive filters 2a, 2b, and 2c, and an eraser 3.

The microphones 11, 12, 13, and 14 obtain voices and convert the voices to signals, respectively, for example. These microphones may be a moving-coil microphone, or may be a ribbon microphone. The microphones may be a capacitor microphone, or may be a laser optical microphone or the like.

The first obtainer 15 is wiredly or wirelessly electrically connected with the microphone 11. The first obtainer 15 receives the signal from the microphone 11, the signal being converted from the voice obtained by the microphone 11. The first obtainer 15 has no delayer.

The second obtainer 16 is wiredly or wirelessly electrically connected with the microphone 12. The second obtainer 16 receives the signal from the microphone 12, the signal being converted from the voice obtained by the microphone 12.

The third obtainer 17 is wiredly or wirelessly electrically connected with the microphone 13. The third obtainer 17 receives the signal from the microphone 13, the signal being converted from the voice obtained by the microphone 13.

The fourth obtainer 18 is wiredly or wirelessly electrically connected with the microphone 14. The fourth obtainer 18 receives the signal from the microphone 14, the signal being converted from the voice obtained by the microphone 14.

The first obtainer 15, the second obtainer 16, the third obtainer 17, the fourth obtainer 18, the delayers 4a, 4b, and 4c, the mixed sounds estimator 2 including the adaptive filters 2a, 2b, and 2c, and the eraser 3 are implemented with processors and memories. The functions of the processors and the memories provided by cloud computing may be used. The first obtainer 15, the second obtainer 16, the third obtainer 17, the fourth obtainer 18, and the adaptive filters 2a, 2b, and 2c may be implemented with dedicated circuits, respectively.

The delayer 4a is wiredly or wirelessly electrically connected with the second obtainer 16, the delayer 4b with the third obtainer 17, and the delayer 4c with the fourth obtainer 18. The delayer 4a, the delayer 4b, and the delayer 4c receive the second signal, the third signal, and the fourth signal received by the second obtainer 16, the third obtainer 17, and the fourth obtainer 18, respectively, and delay the received signals by predetermined times, respectively. Here, the expression "delay the signal" means that each of the signals received by the delayer 4a, the delayer 4b, and the delayer 4c is transmitted to the mixed sounds estimator 2 after a predetermined time has passed. For example, the delayer 4a, the delayer 4b, and the delayer 4c form a group of memories for delaying the signals by predetermined times, where the memories are successively connected to implement a stack. In the group of memories, the obtained signals may be output first in first out (FIFO) to delay the signals. For example, the times to output the signals by the delayer 4a, the delayer 4b, and the delayer 4c each are equal to or less than the value obtained by dividing the distance between the microphone 11 and their corresponding microphone (i.e., the microphone 12, the microphone 13, and the microphone 14) by the sound velocity.

The mixed sounds estimator 2 includes the adaptive filters 2a, 2b, and 2c. The mixed sounds estimator 2 is wiredly or wirelessly electrically connected with the delayer 4a, the delayer 4b, and the delayer 4c. The mixed sounds estimator 2 receives the second signal, the third signal, and the fourth signal delayed by the delayer 4a, the delayer 4b, and the delayer 4c, respectively. On the basis of the second signal, the third signal, and the fourth signal, the mixed sounds estimator 2 estimates the noises mixed in the first signal obtained by the first obtainer 15.

Specifically, the mixed sounds estimator 2 corrects the filter coefficients of the adaptive filters 2a, 2b, and 2c using a predetermined adaptive algorithm such that a signal SO (one example of the output signal) output from the eraser 3 is non-correlated with or independent from the inputs to the adaptive filters 2a, 2b, and 2c. The signal SO is a signal obtained by subtracting a mixed sounds signal S2' from a signal S1 (one example of the first signal) obtained by the microphone 11. Accordingly, after the filter coefficient of the adaptive filter 2a is corrected such that the signal SO is non-correlated with or independent from the input to the adaptive filter 2a, the signal output from the adaptive filter 2a represents the mixed sounds signal S2' included in the signal S1, the mixed sounds signal S2' representing the mixed sounds which are the voice produced by the passenger P2 and mixed in the voice produced by the passenger P1.

The mixed sounds estimator 2 may periodically perform the correction processing of the filter coefficient, or may perform the correction processing every time when the microphones 12, 13, and 14 obtain the signals at a predetermined level or higher. Here, the predetermined adaptive algorithm to be used can be the least-mean-square (LMS) algorithm or an Independent Component Analysis (ICA) algorithm, for example.

The adaptive filters 2a, 2b, and 2c extract necessary signals from the signals received from mathematical filters having variable coefficients. Specifically, as described above, the adaptive filters 2a, 2b, and 2c can calculate new coefficients through calculation to change the coefficients used for the filters, respectively, whenever necessary. For the calculation of the coefficient, dynamic nonlinear feedback control can be used in which the outputs from the adaptive filters 2a, 2b, and 2c are fed back and used. Moreover, the adaptive filters 2a, 2b, and 2c can change the levels (gains) of the outputs of the received signals, respectively. The adaptive filter to be used is an LMS filter, for example.

The eraser 3 is wiredly or wirelessly electrically connected with the first obtainer 15 and the mixed sounds estimator 2. The eraser 3 suppresses the noises estimated by the mixed sounds estimator 2, the noises being contained in the first signal obtained by the first obtainer 15.

For example, in the signal processing device 1, the microphone 11 may be installed in the driver's seat of a vehicle, the microphone 12 may be installed in the passenger's seat of the vehicle, and the microphones 13 and 14 may be installed in the backseats of the vehicle. In this case, the signal processing device 1 operates to suppress noises in the voice of the passenger (driver) in the driver's seat of the vehicle. A symmetrical signal processing system including the components above may be installed in the vehicle to suppress noises in the voices of the passengers in the seats other than the driver's seat of the vehicle. For example, to suppress noises in the voice of the passenger in the passenger's seat of the vehicle, the microphone 11 may be installed in the passenger's seat of the vehicle, the microphone 12 may be installed in the driver's seat of the vehicle, and the microphones 13 and 14 may be installed in the backseat of the vehicle. Alternatively, for example, to suppress noises in the voice of the passenger on the left backseat of the vehicle, the microphone 11 may be installed on the left backseat of the vehicle, the microphone 12 may be installed in the driver's seat of the vehicle, the microphone 13 may be installed in the passenger's seat of the vehicle, and the microphone 14 may be installed on the right backseat of the vehicle. Alternatively, for example, to suppress noises in the voice of the passenger on the right backseat of the vehicle, the microphone 11 may be installed on the right backseat of the vehicle, the microphone 12 may be installed in the driver's seat of the vehicle, the microphone 13 may be installed in the passenger's seat of the vehicle, and the microphone 14 may be installed on the left backseat of the vehicle. A plurality of such symmetrical signal processing systems may be installed.

The connection relations of the microphone 11, the microphone 12, the microphone 13, and the microphone 14 with other components in the signal processing device 1 are the same as described above. The microphones 11, 12, 13, and 14 can be installed in any other places than those listed above. The number of the seats of the vehicle in which the microphones are installed is not limited to 4. Four or more microphones may be installed in four or more places. For example, the microphone may be installed in 6 seats in a passenger car having 3 rows of seats, or may be installed in 6 or more places. Alternatively, the microphone may be installed in 3 or less places.

The signal processing device 1 may include pluralities of these components described above.

Figure 2:
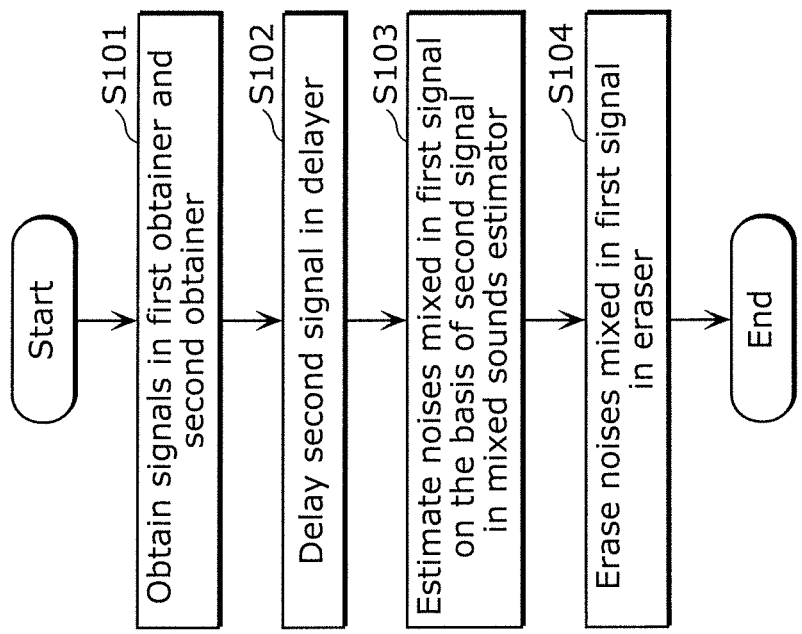
FIG. 2 is a flowchart illustrating an operation of the signal processing device according to the embodiment of the present disclosure.

FIG. 2 is a flowchart illustrating the operation of the signal processing device according to the embodiment of the present disclosure. The flow of the entire system will now be described with reference to the flowchart.

First, in the signal processing device 1, the first obtainer 15 and the second obtainer 16 obtain the first signal and the second signal from the microphone 11 and the microphone 12, respectively (Step S101). At this time, further, the third obtainer 17 and the fourth obtainer 18 may obtain the third signal and the fourth signal from the microphone 13 and the microphone 14, respectively.

Next, in the signal processing device 1, the delayer 4a delays the second signal received from the second obtainer 16 by a predetermined time (Step S102). At this time, further, the delayer 4b and the delayer 4c may delay the third signal received from the third obtainer 17 and the fourth signal received from the fourth obtainer 18 by predetermined times, respectively.

The delayer 4a, the delayer 4b, and the delayer 4c may delay the second signal, the third signal, and the fourth signal for the same period of time, or may delay the second signal, the third signal, and the fourth signal for different periods of time, respectively. The times to delay the second signal, the third signal, and the fourth signal by the delayer 4a, the delayer 4b, and the delayer 4c may be determined according to the positional relations of the microphone 11 with the microphone 12, the microphone 13, and the microphone 14, respectively. Here, for example, the positional relation indicates a distance to the microphone 11. For example, the time to delay the signal may be increased as the distance to the microphone 11 is longer.

The times to delay the second signal, the third signal, and the fourth signal by the delayer 4a, the delayer 4b, and the delayer 4c may be individually determined by the frequencies of the second signal, the third signal, and the fourth signal, respectively. For example, the delayer 4a specifies the frequency of the second signal by frequency analysis. On the basis of the table having a prepared delay time according to the frequency, the delayer 4a may determine the time to delay the signal. The delayer 4a may also determine the time to delay the signal within the same signal according to the frequency component. The delay of the signal is difficult to effectively act on the low frequency signal because of its long wavelength. For example, experiments have revealed that when the time to delay low frequency signal is set at a predetermined time or longer, the degree of suppressing the first signal is reduced. Accordingly, for example, the time to delay the signal having a low frequency component may be set at a predetermined time or longer, and the signal having a high frequency component may be determined at the predetermined time or shorter.

Alternatively, the time to delay the second signal, the third signal, and the fourth signal by the delayer 4a, the delayer 4b, and the delayer 4c may be determined according to the temperature inside the cabin of the vehicle.

The delayer 4a, the delayer 4b, and the delayer 4c set the times to delay the second signal, the third signal, and the fourth signal so as not to exceed the times taken for the voice to propagate in the spaces between the microphone 11 and the microphone 12, the microphone 13, and the microphone 14, respectively. For example, in the case where the distance between the microphone 11 and the microphone 12 is 1 m and the time for the voice to propagate in the space between the microphone 11 and the microphone 12 is 3 msec, the delayer 4a sets a delay time of 3 msec or less for the second signal.

Subsequently, in the signal processing device 1, the mixed sounds estimator 2 estimates noises mixed in the first signal, which is obtained by the first obtainer 15, on the basis of the second signal delayed by the delayer 4a (Step S103). At this time, the mixed sounds estimator 2 may further estimate noises mixed in the first signal, which is obtained by the first obtainer 15, on the basis of the third signal and the fourth signal delayed by the delayer 4b and the delayer 4c, respectively.

In the signal processing device 1, the eraser 3 suppresses the noises in the first signal, which are estimated by the mixed sounds estimator 2 (Step S104).

The state of the signal processed in the signal processing device 1 will now be described with reference to FIGS. 3 to 8.

In the signal processing device 1, the estimation of the signals representing the target voice as a noise can be prevented by delaying the signals obtained by the second obtainer 16, the third obtainer 17, and the fourth obtainer 18 for suitable times, where the signals representing the target voice are included in the signals which represent voices and are obtained by the second obtainer 16, the third obtainer 17, and the fourth obtainer 18, respectively. The signals representing the target voice included in the signals, which represent voices and are obtained by the second obtainer 16, the third obtainer 17, and the fourth obtainer 18, respectively, reach the eraser 3 behind the signal representing the target voice obtained by the first obtainer 15. Such a configuration does not cause the eraser 3 to suppress the target voice obtained by the first obtainer 15 on the basis of the signals representing the target voice included in the signals which represent voices and are obtained by the second obtainer 16, the third obtainer 17, and the fourth obtainer 18, respectively.

Figure 3:
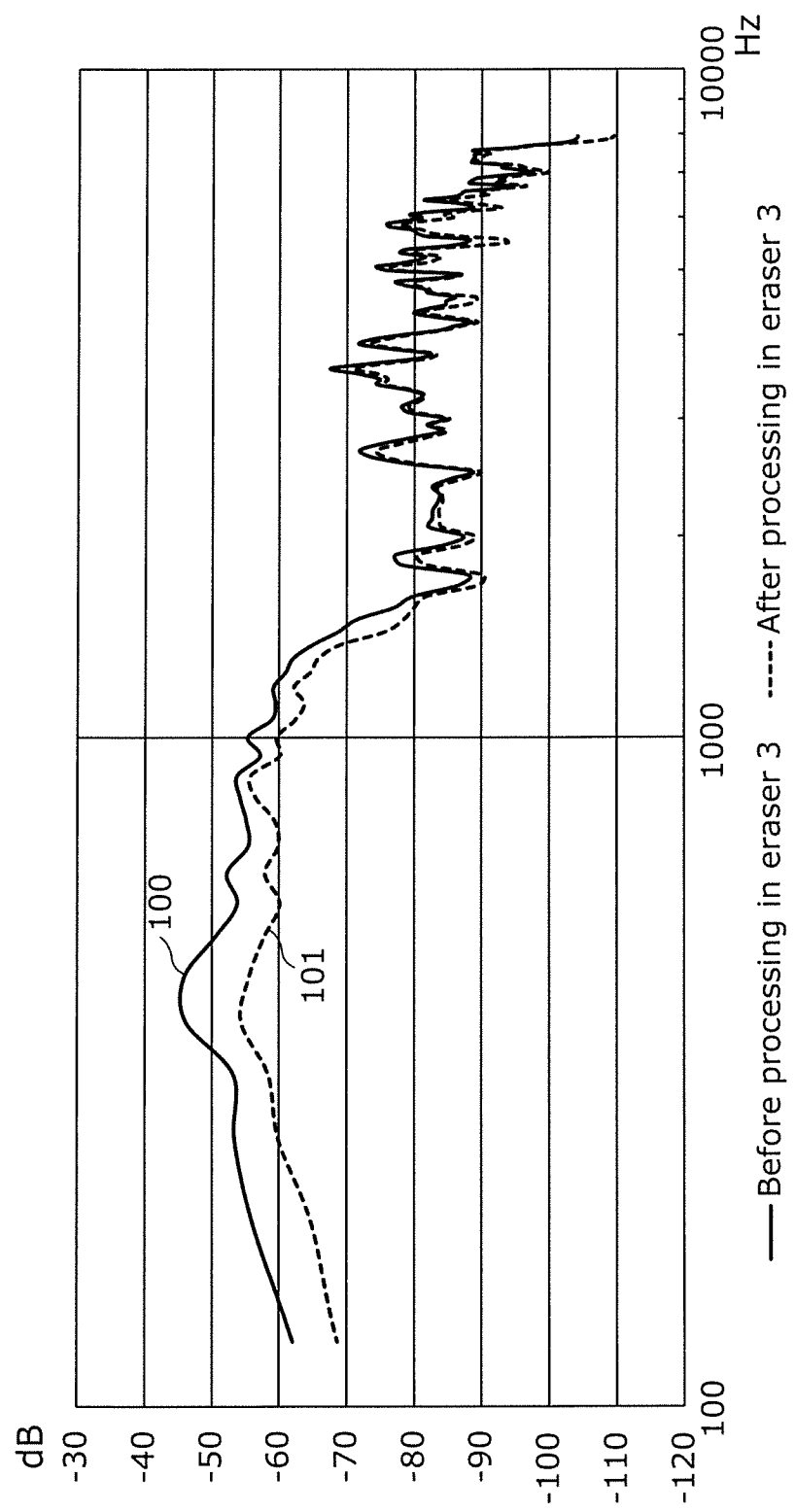
FIG. 3 is a graph illustrating the frequency characteristics of a signal, which represents a voice of a driver obtained from a microphone 11 installed in a driver's seat, before and after the processing by an eraser when a delayer delays the signal by 0 msec in the embodiment according to the present disclosure.

FIG. 3 is a graph illustrating the frequency characteristics of the signal, which represents the voice of the driver obtained by the microphone 11 installed in the driver's seat, before and after the processing by the eraser when the delayer delays a corresponding signal by 0 msec in the embodiment according to the present disclosure. A line 100 represents the frequency characteristics of the first signal not processed by the eraser 3 when the delayer 4a delays the second signal by 0 msec. A line 101 represents the frequency characteristics of the first signal processed by the eraser 3 when the delayer 4a delays the second signal by 0 msec. The line 101 has a value lower than that of the line 100 at a frequency ranging from about 100 Hz to about 10000 Hz. In other words, when the delayer 4a delays the second signal by 0 msec and the eraser 3 is operated, the eraser 3 undesirably suppresses the first signal. This occurs because the second signal includes a signal having the same waveform as that of the first signal, and the erasing of the noises estimated using the second signal results in the suppression of the first signal.

For example, consider the case where the voice obtained by the microphone 12 installed in the passenger's seat is used to suppress noises in the voice obtained by the microphone 11 installed in the driver's seat. The voice produced by the driver is subjected to reflection inside the cabin of the vehicle, and is mixed in the voice obtained by the microphone 12 installed in the passenger's seat. On the basis of the voice of the driver mixed in the voice obtained by the microphone 12 installed in the passenger's seat, the voice of the driver included in the voice obtained by the microphone 11 installed in the driver's seat is undesirably suppressed.

Figure 4:
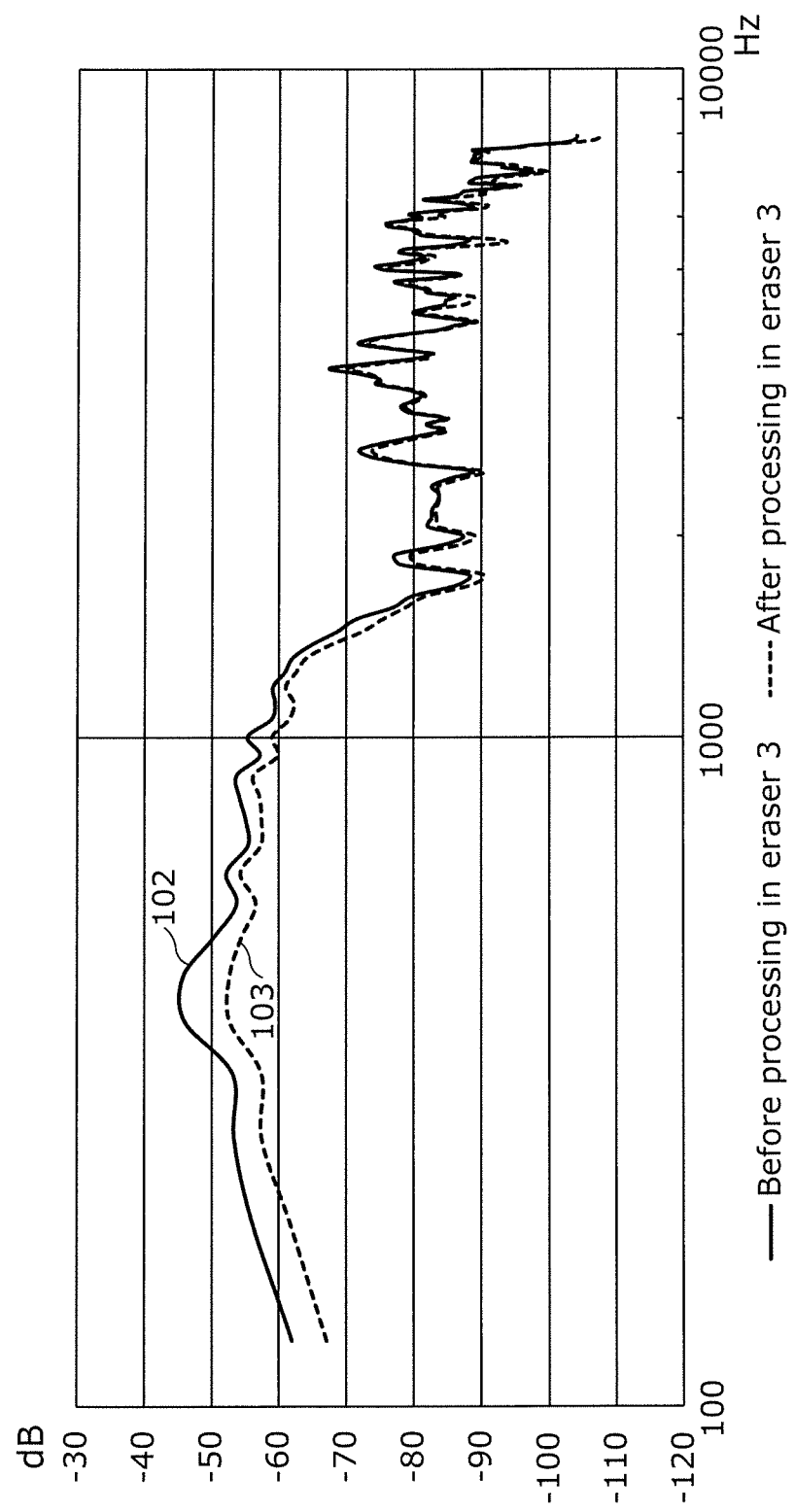
FIG. 4 is a graph illustrating the frequency characteristics of a signal, which represents a voice of a driver obtained from a microphone 11 installed in a driver's seat, before and after the processing by an eraser when a delayer delays the signal by 2 msec in the embodiment according to the present disclosure.

FIG. 4 is a graph illustrating the frequency characteristics of the signal, which represents the voice of the driver obtained by the microphone 11 installed in the driver's seat, before and after the processing by the eraser when the delayer delays a corresponding signal by 2 msec in the embodiment according to the present disclosure. A line 102 represents the frequency characteristics of the first signal not processed by the eraser 3 when the delayer 4a delays the second signal by 2 msec. A line 103 represents the frequency characteristics of the first signal processed by the eraser 3 when the delayer 4a delays the second signal by 2 msec. Although the line 103 has a value lower than that of the line 102 at a frequency ranging from about 100 Hz to about 10000 Hz, the difference is smaller than that between the values represented by the line 100 and the line 101 shown in FIG. 3.

In other words, when the delayer 4a delays the second signal by 2 msec and the eraser 3 is operated, the amount of the first signal to be suppressed by the eraser 3 is reduced. This occurs because the signal which is included in the second signal and has the same waveform as that of the first signal is reduced as a result of the delay of the second signal by 2 msec. Accordingly, the suppression of the first signal as a result of the erasing of the noises estimated using the second signal is more significantly reduced than that in the case illustrated in FIG. 3.

Here, the delay by 2 msec corresponds to about 60 cm to about 70 cm in terms of the distance of the voice propagating because the sound velocity in the air is about 340 m/sec. In other words, in the case where the microphones 11 and 12 are installed with the microphones spaced about 60 cm to about 70 cm from each other, the time needed for the voice of the driver to reach the microphone 12 is about 2 msec.

For example, consider the case where the voice obtained by the microphone 12 installed in the passenger's seat is used to suppress noises in the voice obtained by the microphone 11 installed in the driver's seat. The voice produced by the driver is subjected to reflection inside the cabin of the vehicle, and is mixed in the voice obtained by the microphone 12 installed in the passenger's seat. However, by 2 msec delaying the signal representing the voice obtained by the microphone 12 installed in the passenger's seat, the degree of suppression of the voice of the driver included in the voice obtained by the microphone 11 installed in the driver's seat is reduced on the basis of the voice of the driver included in the voice obtained by the microphone 12 installed in the passenger's seat. For the eraser 3 to suppress the voice of the driver included in the voice obtained by the microphone 11 installed in the driver's seat on the basis of the voice of the driver included in the voice obtained by the microphone 12 installed in the passenger's seat, the voice obtained by the microphone 12 installed in the passenger's seat should reach the eraser 3 before the voice obtained by the microphone 11 installed in the driver's seat does. However, by delaying the voice obtained by the microphone 12 installed in the passenger's seat, the voice obtained by the microphone 12 installed in the passenger's seat cannot reach the eraser 3 before the voice obtained by the microphone 11 installed in the driver's seat does. Such a configuration reduces the degree of suppression of the voice of the driver included in the voice obtained by the microphone 11 installed in the driver's seat by the eraser 3 on the basis of the voice of the driver included in the voice obtained by the microphone 12 installed in the passenger's seat.

Figure 5:
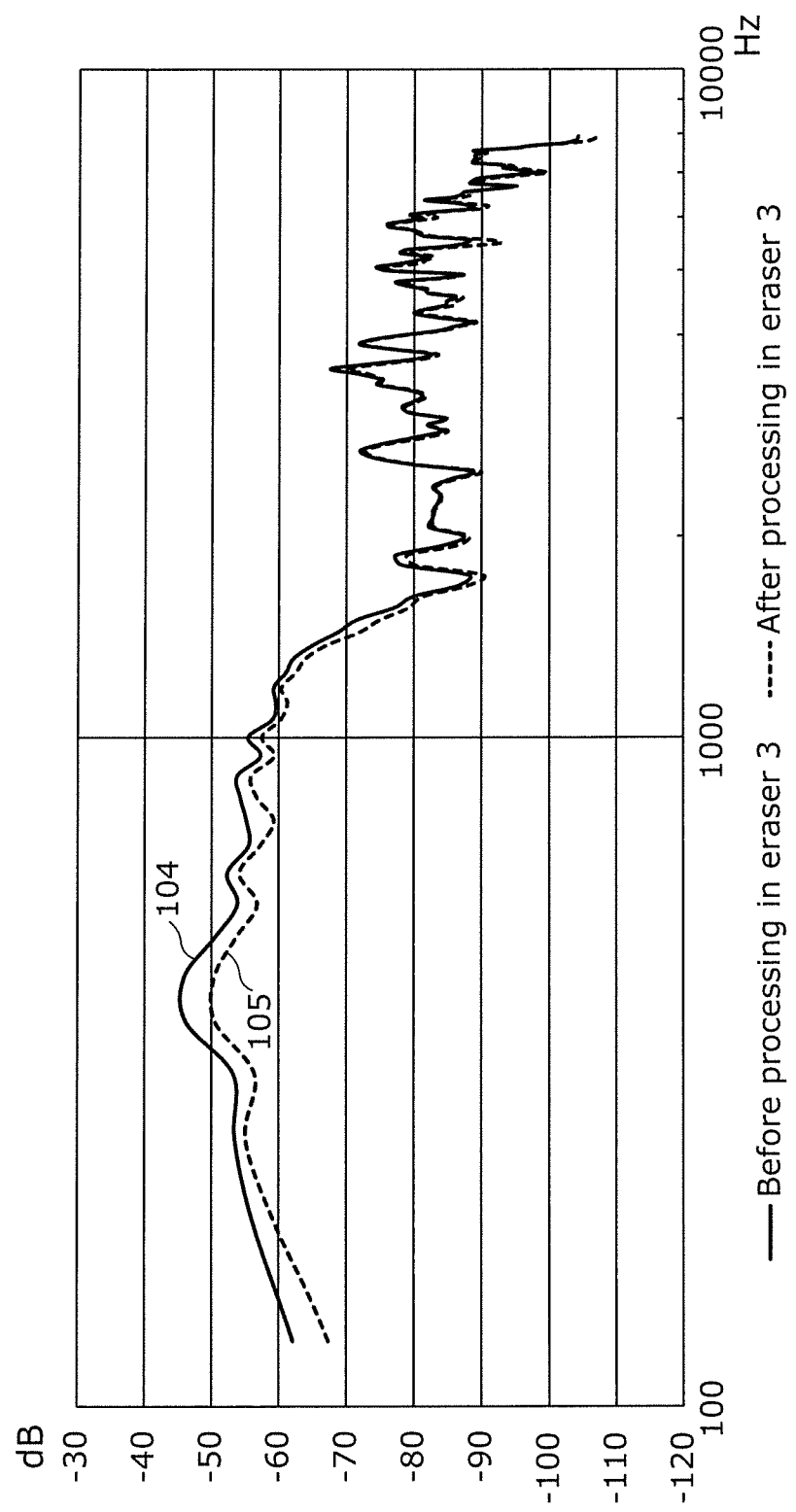
FIG. 5 is a graph illustrating the frequency characteristics of a signal, which represents a voice of a driver obtained from a microphone 11 installed in a driver's seat, before and after the processing by an eraser when a delayer delays the signal by 6 msec in the embodiment according to the present disclosure.

FIG. 5 is a graph illustrating the frequency characteristics of the signal, which represents the voice of the driver obtained by the microphone 11 installed in the driver's seat, before and after the processing by the eraser when the delayer delays a corresponding signal by 6 msec in the embodiment according to the present disclosure. The line 104 represents the frequency characteristics of the first signal not processed by the eraser 3 when the first signal is delayed by 6 msec. The line 105 represents the frequency characteristics of the first signal processed by the eraser 3 when the first signal is delayed by 6 sec. Although the line 105 has a value lower than that in the line 104 at a frequency ranging from about 100 Hz to about 10000 Hz, the difference between the values represented by the line 104 and the line 105 is smaller than that between the values represented by the line 102 and the line 103 shown in FIG. 4.

In other words, when the delayer 4a delays the second signal by 6 msec and the eraser 3 is operated, the amount of the first signal to be suppressed by the eraser 3 is reduced. This occurs because the signal which is included in the second signal and has the same waveform as that of the first signal is reduced by delaying the second signal by 6 msec. Accordingly, by erasing the noises estimated using the second signal, the degree of suppression of the first signal is more significantly reduced than the difference between the values represented by the line 102 and the line 103 shown in FIG. 4.

For example, consider the case where the voice obtained by the microphone 12 installed in the passenger's seat is used to suppress noises in the voice obtained by the microphone 11 installed in the driver's seat. The voice produced by the driver is subjected to reflection inside the cabin of the vehicle, and is mixed in the voice obtained by the microphone 12 installed in the passenger's seat. However, by 6 msec delaying the signal representing the voice obtained by the microphone 12 installed in the passenger's seat, the degree of suppression of the voice of the driver included in the voice obtained by the microphone 11 installed in the driver's seat is more significantly reduced than that in the case of the 2 msec delay, on the basis of the voice of the driver included in the voice obtained by the microphone 12 installed in the passenger's seat.

As shown in FIGS. 3, 4, and 5, the delay of the signal representing the target voice in the delayer results in a reduction in degree of suppression of the signal.

Figure 6:
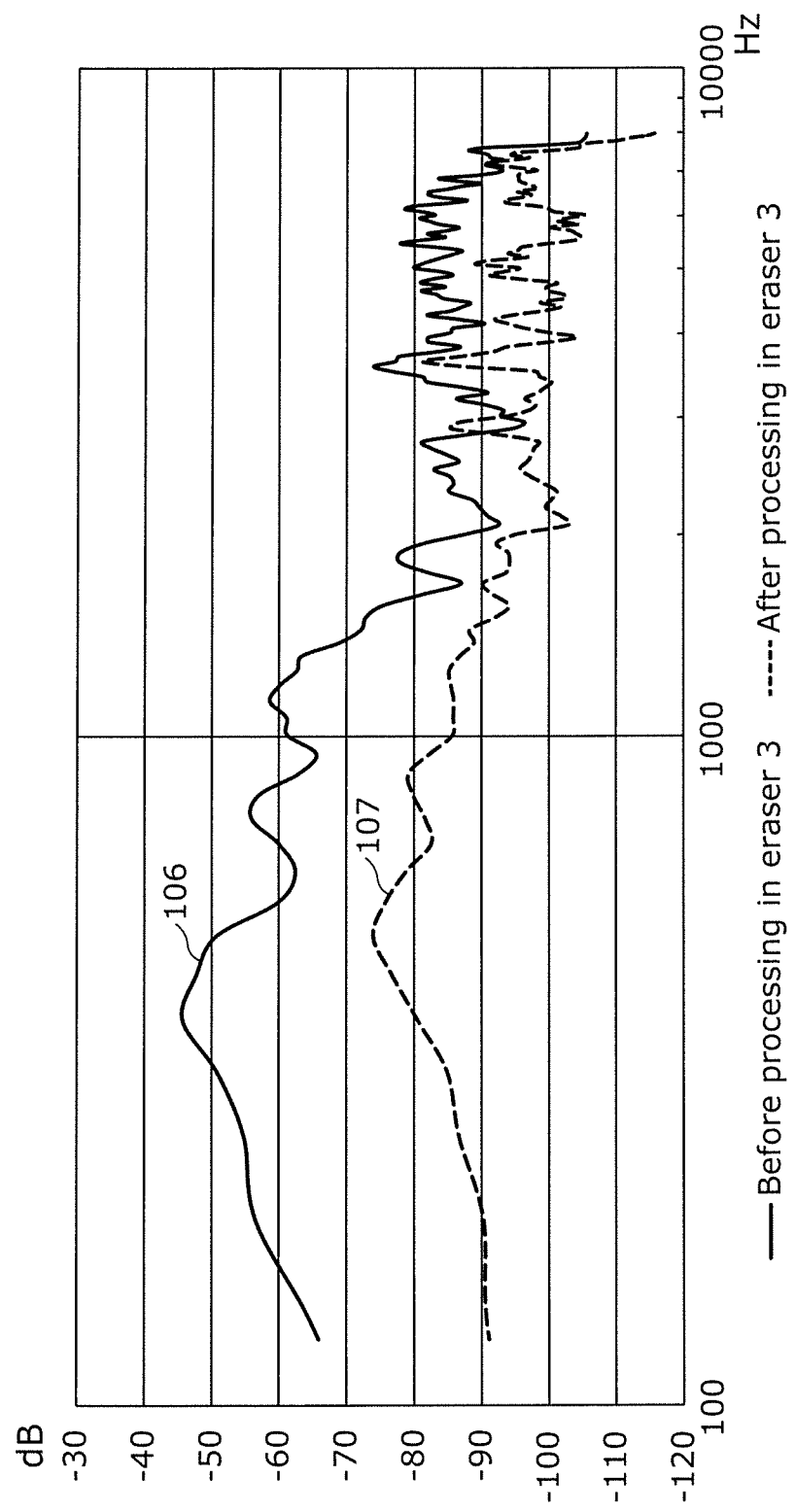
FIG. 6 is a graph illustrating the frequency characteristics of a signal, which represents a voice of a passenger in a passenger's seat obtained from the microphone 11 installed in a driver's seat, before and after the processing by the eraser when the delayer delays the signal by 0 msec in the embodiment according to the present disclosure.

FIG. 6 is a graph illustrating the frequency characteristics of the signal, which represents the voice of the passenger in the passenger's seat obtained by the microphone 11 installed in the driver's seat, before and after the processing by the eraser when the delayer delays the signal by 0 msec in the embodiment according to the present disclosure. A line 106 represents the frequency characteristics of the first signal not processed by the eraser 3 when the first signal is delayed by 0 msec. A line 107 represents the frequency characteristics of the first signal processed by the eraser 3 when the first signal is delayed by 0 msec. The line 107 has a value about 20 dB lower than that in the line 106 at a frequency ranging from about 100 Hz to about 10000 Hz. In other words, the voice of the passenger in the passenger's seat picked up by the microphone 11 installed in the driver's seat is suppressed.

For example, consider the case where the voice obtained by the microphone 12 installed in the passenger's seat is used to suppress noises in the voice obtained by the microphone 11 installed in the driver's seat. The voice produced by the passenger in the passenger's seat is mixed in the voice obtained by the microphone 11 installed in the driver's seat directly or after undergoing reflection inside the cabin of the vehicle. Such mixed noises are removed from the voice obtained by the microphone 11 installed in the driver's seat, through estimation using the waveform of the signal of the voice obtained by the microphone 12 installed in the passenger's seat. In the case where the signal representing the voice obtained by the microphone 12 installed in the passenger's seat is delayed by 0 msec, the voice obtained by the microphone 11 installed in the driver's seat is about 20 dB suppressed as illustrated in FIG. 6.

Figure 7:
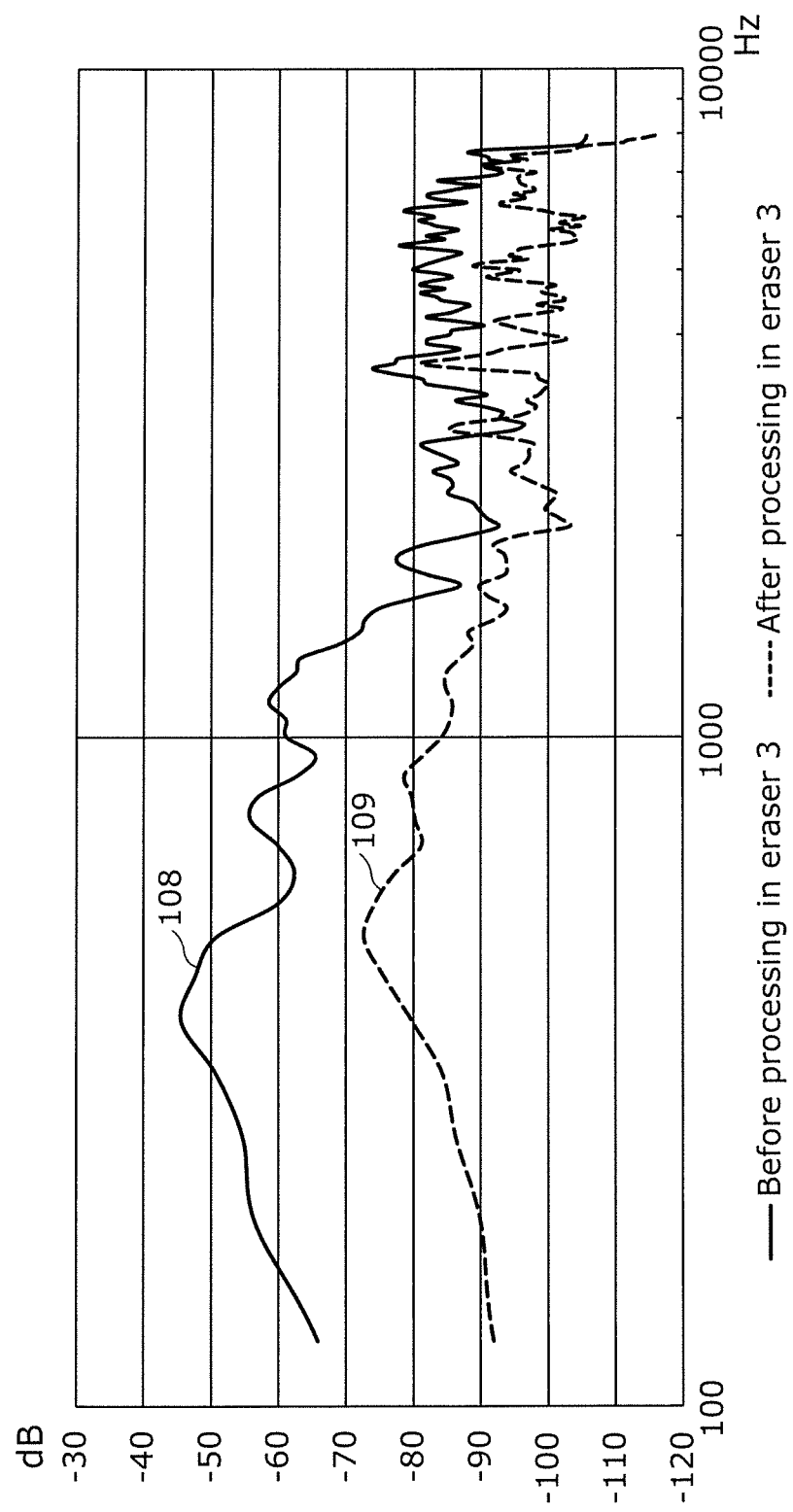
FIG. 7 is a graph illustrating the frequency characteristics of a signal, which represents a voice of a passenger in a passenger's seat obtained from the microphone 11 installed in a driver's seat, before and after the processing by the eraser when the delayer delays the signal by 2 msec in the embodiment according to the present disclosure.

FIG. 7 is a graph illustrating the frequency characteristics of the signal, which represents the voice of the passenger in the passenger's seat obtained by the microphone 11 installed in the driver's seat, before and after the processing by the eraser when the delayer delays the signal by 2 msec in the embodiment according to the present disclosure. A line 108 represents the frequency characteristics of the first signal not processed by the eraser 3 when the first signal is delayed by 2 msec. A line 109 represents the frequency characteristics of the first signal processed by the eraser 3 when the first signal is delayed by 2 msec. The line 109 has a value lower than that in the line 108 at a frequency ranging from about 100 Hz to about 10000 Hz. However, the amount of the first signal suppressed shown in FIG. 7 is more significantly reduced than that shown in FIG. 6.

For example, consider the case where the voice obtained by the microphone 12 installed in the passenger's seat is used to suppress noises in the voice obtained by the microphone 11 installed in the driver's seat. As described above, the voice produced by the passenger in the passenger's seat is mixed in the voice obtained by the microphone 11 installed in the driver's seat directly or after undergoing reflection inside the cabin of the vehicle. Such mixed noises are removed from the voice obtained by the microphone 11 installed in the driver's seat, through estimation using the waveform of the signal of the voice obtained by the microphone 12 installed in the passenger's seat. As illustrated in FIG. 7, in the case where the signal representing the voice obtained by the microphone 12 installed in the passenger's seat is delayed by 2 msec, the degree of suppression of the voice obtained by the microphone 11 installed in the driver's seat is more significantly reduced than in the case where the signal representing the voice obtained by the microphone 12 installed in the passenger's seat is delayed by 0 msec. It is desirable that the signal representing the voice obtained by the microphone 12 installed in the passenger's seat should not delayed, to estimate the voice of the passenger in the passenger's seat mixed in the voice obtained by the microphone 11 installed in the driver's seat as noises and suppress the noises in the voice obtained by the microphone 11 installed in the driver's seat.

Figure 8:
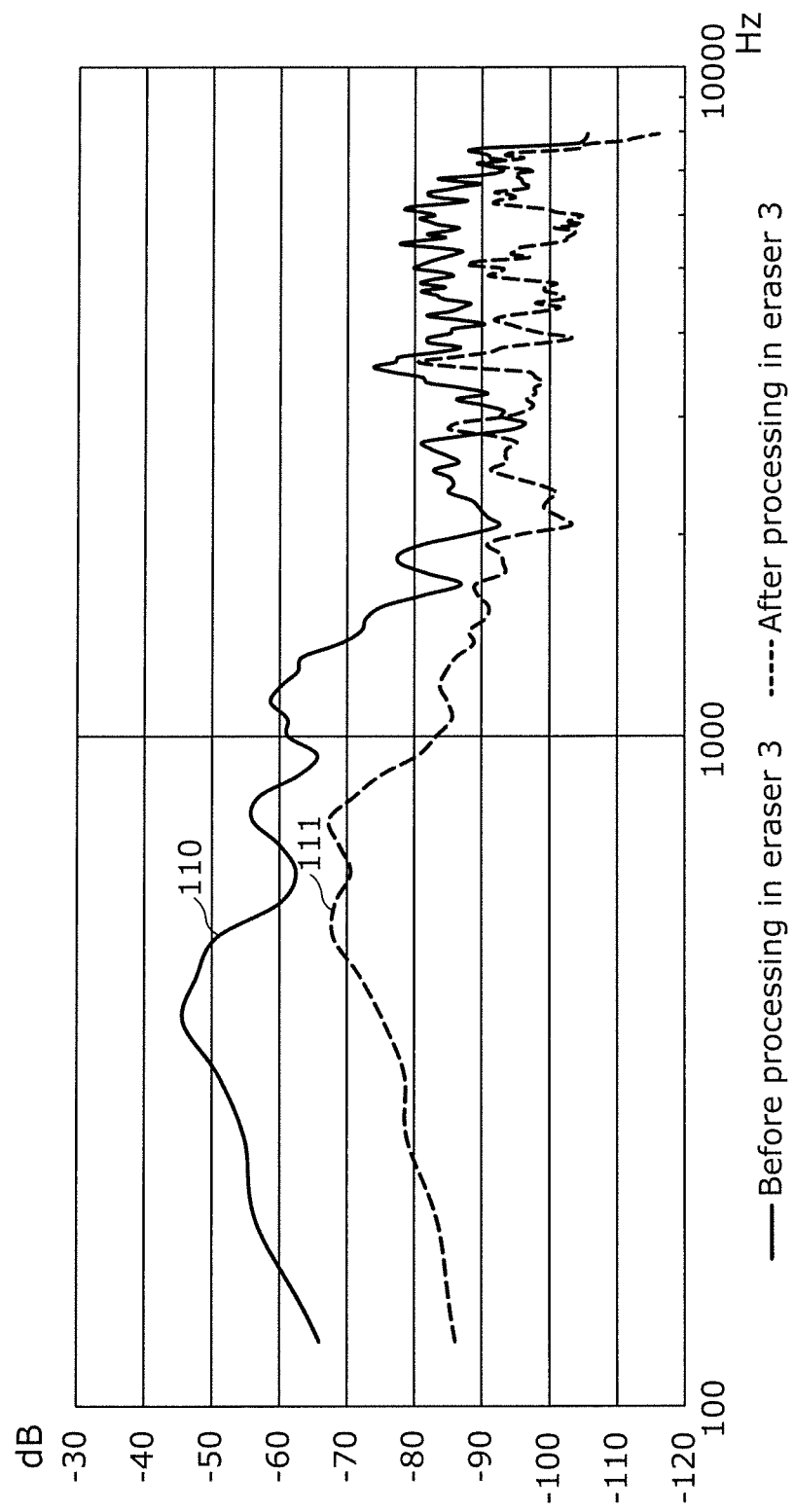
FIG. 8 is a graph illustrating the frequency characteristics of a signal, which represents a voice of a passenger in a passenger's seat obtained from the microphone 11 installed in a driver's seat, before and after the processing by the eraser when the delayer delays the signal by 6 msec in the embodiment according to the present disclosure.

FIG. 8 is a graph illustrating the frequency characteristics of the signal, which represents the voice of the passenger in the passenger's seat obtained by the microphone 11 installed in the driver's seat, before and after the processing by the eraser when the delayer delays the signal by 6 msec in the embodiment according to the present disclosure. A line 110 represents the frequency characteristics of the first signal not processed by the eraser 3 when the first signal is delayed by 6 msec. A line 111 represents the frequency characteristics of the first signal processed by the eraser 3 when the first signal is delayed by 6 msec. The line 111 has a value lower than that in the line 110 at a frequency ranging from about 100 Hz to about 10000 Hz. However, the amount of suppression shown in FIG. 8 is more significantly reduced than that shown in FIG. 7.

For example, consider the case where the voice obtained by the microphone 12 installed in the passenger's seat is used to suppress noises in the voice obtained by the microphone 11 installed in the driver's seat. As described above, the voice produced by the passenger in the passenger's seat is mixed in the voice obtained by the microphone 11 installed in the driver's seat directly or after undergoing reflection inside the cabin of the vehicle. Such mixed noises are removed from the voice obtained by the microphone 11 installed in the driver's seat, through estimation using the waveform of the signal of the voice obtained by the microphone 12 installed in the passenger's seat. As illustrated in FIG. 8, in the case where the signal representing the voice obtained by the microphone 12 installed in the passenger's seat is delayed by 6 msec, the degree of suppression of the voice obtained by the microphone 11 installed in the driver's seat is more significantly reduced than in the case where the signal representing the voice obtained by the microphone 12 installed in the passenger's seat is delayed by 0 msec and the case where the signal representing the voice obtained by the microphone 12 installed in the passenger's seat is delayed by 2 msec. It is desirable that the signal representing the voice obtained by the microphone 12 installed in the passenger's seat should not delayed, to estimate the voice of the passenger in the passenger's seat mixed in the voice obtained by the microphone 11 installed in the driver's seat as noises and suppress the noises in the voice obtained by the microphone 11 installed in the driver's seat.

As shown in FIGS. 6, 7, and 8, the delay of the signal representing a voice as one of noises in the delayer 4a results in a reduction in degree of suppression of noises. Accordingly, to suppress the signal representing the voice as one of noises in the delayer 4a, it is desirable that the signal should not be delayed for a time beyond a predetermined time.

Conversely, not to suppress the target voice, as shown in FIGS. 3, 4, and 5, it is desirable that the signal should be delayed at a predetermined time or longer. It should be noted, as described above, that the times to delay the signal are set by the delayers 4a, 4b, and 4c so as not to exceed the times taken for the voice to propagate in the spaces between the microphone 11 and the microphone 12, the microphone 13, and the microphone 14, respectively.

The times to delay the signals set by the delayers 4a, 4b, and 4c may be determined on the basis of the trend of suppression of the voice in the signal processing device 1 as shown in FIGS. 3 to 8.

Modification

Figure 9:
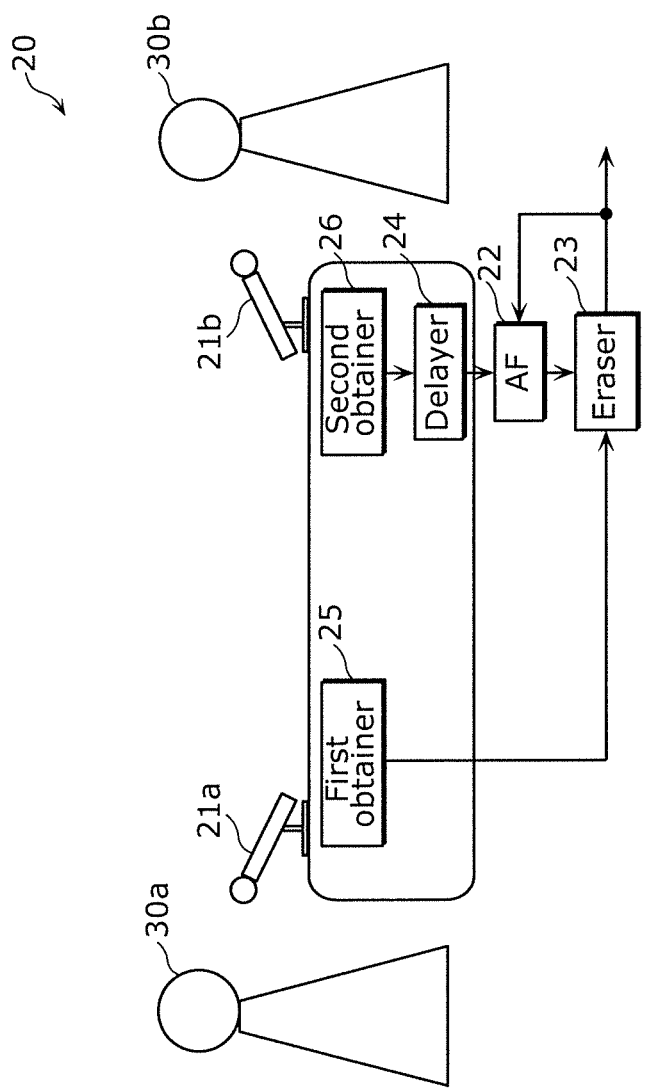
FIG. 9 is a diagram illustrating a translation system to which the signal processing system according to a modification of the present disclosure is applied.

The signal processing device 1 above can also be applied to a translation system 20 which recognizes the voice of a speaker, translates the speech into another language, and outputs the translation. FIG. 9 is a diagram illustrating a translation system to which the signal processing system is applied in a modification according to the present disclosure. As illustrated in FIG. 9, a translation system 20 includes microphones 21a and 21b, a first obtainer 25, a second obtainer 26, a delayer 24 including an adaptive filter 22, and an eraser 23. The translation system 20 may further include an information processor which recognizes and translates the voice in which noises are suppressed, and an outputter which outputs the result of translation.

The first obtainer 25 is wiredly or wirelessly electrically connected with the microphone 21a. The first obtainer 25 obtains a first signal of a voice or the like from the microphone 21a. The first obtainer 25 receives the signal from the microphone 21a, the signal being converted from the voice obtained by the microphone 21a.

The second obtainer 26 is wiredly or wirelessly electrically connected with the microphone 21b. The second obtainer 26 obtains a second signal of a voice or the like from the microphone 21b. The second obtainer 26 receives the signal from the microphone 21b, the signal being converted from the voice obtained by the microphone 21b.

The first obtainer 25, the second obtainer 26, the delayer 24 including the adaptive filter 22, and the eraser 23 are implemented with processors and memories. The functions of the processors and the memories provided by cloud computing may be used. The first obtainer 25, the second obtainer 26, and the adaptive filter 22 may be implemented with dedicated circuits, respectively.

The delayer 24 is wiredly or wirelessly electrically connected with the second obtainer 26. The delayer 24 receives a fifth signal obtained by the second obtainer 26, and delays the received signal by a predetermined time.

The adaptive filter 22 is wiredly or wirelessly electrically connected with the delayer 24. The adaptive filter 22 receives the fifth signal delayed by the delayer 24. On the basis of the fifth signal, the adaptive filter 22 estimates the noises mixed in the fifth signal obtained by the first obtainer 25.

The adaptive filter 22 extracts a necessary signal from the received signal through a mathematical filter having a variable coefficient. The adaptive filter 22 can calculate a new coefficient through calculation to change the coefficient used in the filter, whenever necessary.

The eraser 23 is wiredly or wirelessly electrically connected with the first obtainer 25 and the adaptive filter 22. The eraser 23 suppresses the noises estimated by the adaptive filter 22 in the fifth signal obtained in the first obtainer 25.

It is supposed that the translation system 20 according to the modification of the present disclosure is used by a person 30a and a person 30b face-to-face. In the translation system 20, the voice produced by the person 30a is obtained by the first obtainer 25 through the microphone 21a. In the translation system 20, the voice produced by the person 30b is obtained by the second obtainer 26 through the microphone 21b. The audio signal obtained by the second obtainer 26 is delayed for a predetermined time by the delayer 24, and is processed by the adaptive filter 22. The information of the noises estimated by the adaptive filter 22 then reaches the eraser 23. From the audio signal obtained by the first obtainer 25, the eraser 23 suppresses the noises estimated by the adaptive filter 22.

The audio signal in which the noises are suppressed undergoes translation processing, and the result thereof is output. Thus, the translation system 20 can suppress noises, such as the voice produced by the person 30b, in the voice produced by the person 30a. The number of the components included in the translation system 20 may be increased compared to the number thereof listed above. Although it is supposed that two persons use the translation system 20 according to the modification of the present disclosure, the system can be used by any number of persons other than 2. The translation system 20 according to the modification of the present disclosure may have a configuration allowing use thereof by 3 or more persons.

These general or specific aspects may be implemented with a system, a method, an integrated circuit, a computer program, or a recording medium such as a computer-readable CD-ROM, or may be implemented with any combination of a system, a method, an integrated circuit, a computer program, and a recording medium.

Although the signal processing device 1 and the signal processing method have been described as above according to the embodiment, the signal processing system and the signal processing method are not construed as limitations to the embodiment. A variety of modifications of the present embodiment conceived by a person skilled in the art and embodiments including combinations of components according to different embodiments may also be included in the scope of one or more aspects without departing from the gist of the present disclosure.

Although the present invention has been described and illustrated in detail, it is clearly understood that the same is by way of example only and is not to be taken by way of limitation, the scope of the present invention being limited only by the terms of the appended claims.

INDUSTRIAL APPLICABILITY

The present disclosure is applicable to a vehicle-installed sound collecting system or a translation system.

The invention claimed is:

1. A signal processing device, comprising:
a first obtainer which obtains a first signal output from a first microphone and includes noises to be erased;
a second obtainer which obtains a second signal, the second signal being a signal output from a second microphone installed in a position different from a position where the first microphone is installed, and being used for estimating the noises;
a delayer which delays the second signal by a time corresponding to a time taken for voice to propagate in a space between the first microphone and the second microphone;
a mixed sounds estimator which estimates the second signal delayed by the delayer as noises mixed in the first signal; and
an eraser which erases the noises from the first signal, the noises being estimated by the mixed sounds estimator.

2. The signal processing device according to claim 1, wherein the delayer delays the second signal by a time determined on a basis of a positional relation between the first microphone and the second microphone.

3. The signal processing device according to claim 1, wherein the delayer delays the second signal on a basis of a frequency component included in the second signal.

4. A signal processing method, comprising:
obtaining a first signal output from a first microphone and includes noises to be erased;
obtaining a second signal, the second signal being a signal output from a second microphone installed in a position different from a position where the first microphone is installed, and being used for estimating the noises;
delaying the second signal by a time corresponding to a time taken for voice to propagate in a space between the first microphone and the second microphone;
estimating the second signal delayed by the delaying as noises mixed in the first signal; and
erasing the noises from the first signal, the noises being estimated in the estimating.

5. A signal processing device, comprising:
a first obtainer which obtains a first signal output from a first microphone;
a second obtainer which obtains a second signal output from a second microphone installed in a position different from a position where the first microphone is installed;
a delayer which delays a low frequency component of the second signal by a time longer than a predetermined time and delays a high frequency component of the second signal by a time shorter than the predetermined time;
a mixed sounds estimator which estimates the second signal delayed by the delayer as noises mixed in the first signal; and
an eraser which erases the noises from the first signal, the noises being estimated by the mixed sounds estimator.

* * * * *